(12) United States Patent
Itabashi et al.

(10) Patent No.: US 12,304,178 B2
(45) Date of Patent: May 20, 2025

(54) CUSHION MATERIAL AND CUSHION MATERIAL MANUFACTURING METHOD

(71) Applicant: Archem Inc., Tokyo (JP)

(72) Inventors: Taichi Itabashi, Tokyo (JP); Yukiko Yamaguchi, Tokyo (JP); Satoshi Ienaga, Tokyo (JP); Yoshiyuki Takahashi, Tokyo (JP)

(73) Assignee: Archem Inc., Tokyo (JP)

( * ) Notice: Subject to any disclaimer, the term of this patent is extended or adjusted under 35 U.S.C. 154(b) by 74 days.

(21) Appl. No.: 17/756,826

(22) PCT Filed: Dec. 7, 2020

(86) PCT No.: PCT/JP2020/045542
§ 371 (c)(1),
(2) Date: Jun. 3, 2022

(87) PCT Pub. No.: WO2021/117690
PCT Pub. Date: Jun. 17, 2021

(65) Prior Publication Data
US 2023/0012495 A1 Jan. 19, 2023

(30) Foreign Application Priority Data
Dec. 13, 2019 (JP) .................. 2019-225211

(51) Int. Cl.
*B32B 25/04* (2006.01)
*B32B 5/18* (2006.01)
(Continued)

(52) U.S. Cl.
CPC .............. *B32B 25/045* (2013.01); *B32B 5/18* (2013.01); *B32B 27/065* (2013.01); *B32B 27/40* (2013.01);
(Continued)

(58) Field of Classification Search
CPC ......... A47C 27/14; B29C 33/14; B29C 39/02; B29C 39/24; B29C 44/00; B29C 44/02;
(Continued)

(56) References Cited

U.S. PATENT DOCUMENTS 9,808,968 B2   11/2017   Yonezawa et al.
9,815,232 B2   11/2017   Nabeshima et al.
(Continued)

FOREIGN PATENT DOCUMENTS

CN   102438486 A   5/2012
CN   103958147 A   7/2014
(Continued)

OTHER PUBLICATIONS

Translation of JP-2007045099-A, Ryohei Koyama, Feb. 22, 2007. (Year: 2007).*
(Continued)

*Primary Examiner* — Hai Vo
(74) *Attorney, Agent, or Firm* — KENJA IP LAW PC

(57) ABSTRACT

A cushion material with improved vibration absorptivity, and a cushion material manufacturing method for easily obtaining the cushion material are provided. The cushion material (1) includes a foam body (2) having a surface portion (20) formed of an air permeability control surface portion (21) and an air permeability uncontrol surface portion (22), and a covering material (3) configured to cover the air permeability uncontrol surface portion (22). The cushion material manufacturing method is a cushion material manufacturing method for obtaining the cushion material (1), and includes covering the air permeability uncontrol surface portion (22) of the foam body (2) with the covering material (3).

7 Claims, 10 Drawing Sheets

(51) Int. Cl.
  *B32B 27/06* (2006.01)
  *B32B 27/40* (2006.01)

(52) U.S. Cl.
  CPC ... *B32B 2266/0278* (2013.01); *B32B 2307/50* (2013.01); *B32B 2307/724* (2013.01); *B32B 2601/00* (2013.01)

(58) Field of Classification Search
  CPC ... B29C 44/36; B29C 44/58; B32B 2266/025; B32B 2266/0278; B32B 2307/50; B32B 2307/724; B32B 25/00; B32B 25/045; B32B 2601/00; B32B 27/065; B32B 27/40; B32B 5/18; B68G 7/05
  See application file for complete search history.

(56) References Cited

U.S. PATENT DOCUMENTS

| | | | |
|---|---|---|---|
| 10,434,900 B2 | 10/2019 | Hirayama et al. | |
| 10,470,577 B2 | 11/2019 | Tobata et al. | |
| 2003/0040547 A1* | 2/2003 | Watanabe | B32B 5/18 521/50 |
| 2012/0011656 A1 | 1/2012 | Daly | |
| 2020/0013384 A1* | 1/2020 | Hasegawa | B60R 13/083 |
| 2022/0119611 A1* | 4/2022 | Kaneko | C08L 23/16 |

FOREIGN PATENT DOCUMENTS

| | | |
|---|---|---|
| CN | 105408082 A | 3/2016 |
| CN | 106993907 A | 8/2017 |
| CN | 106998921 A | 8/2017 |
| CN | 108327592 A | 7/2018 |
| CN | 109152487 A | 1/2019 |
| JP | 86238192 A | 2/1987 |
| JP | H06182067 A | 7/1994 |
| JP | 2004083884 A * | 3/2004 |
| JP | 2007045099 A * | 2/2007 |
| JP | 2009125217 A | 6/2009 |
| JP | 5393085 B2 | 1/2014 |
| JP | 2016123545 A | 7/2016 |
| JP | 2019104459 A | 6/2019 |
| WO | 2017155766 A1 | 9/2017 |

OTHER PUBLICATIONS

Translation of JP 2004-083884 to Kaku et al., Mar. 18, 2004. (Year: 2004).*
Feb. 9, 2021, International Search Report issued in the International Patent Application No. PCT/JP2020/045542.
May 17, 2022, International Preliminary Report on Patentability issued in the International Patent Application No. PCT/JP2020/045542.
Jun. 4, 2024, search result of Office Action issued by the China National Intellectual Property Administration in the corresponding Chinese Patent Application No. 202080085103.6.

* cited by examiner

CUSHION MATERIAL AND CUSHION MATERIAL MANUFACTURING METHOD

TECHNICAL FIELD

The present disclosure relates to a cushion material and a cushion material manufacturing method.

BACKGROUND

As cushion materials, there are polyurethane foam-molded products in which a part of a surface is a smooth portion with a surface roughness of 2 to 20 μm, and the air permeability of a surface portion of the smooth portion is restrained to a low level (refer to, for example, Patent Literature (PTL) 1). Such a cushion material serves to provide a seat pad with sufficiently low vibration transmissibility and excellent vibration absorptivity, owing to the low air permeability of the surface portion.

CITATION LIST

Patent Literature

PTL 1: JP5393085

SUMMARY

Technical Problem

However, there is still room for improvement with respect to the above-described cushion material in terms of improving the vibration absorptivity.

It would be helpful to provide a cushion material with improved vibration absorptivity, and a cushion material manufacturing method for easily obtaining the cushion material.

Solution to Problem

A cushion material according to the present disclosure includes: a foam body having a surface portion formed of an air permeability control surface portion and an air permeability uncontrol surface portion; and a covering material configured to cover the air permeability uncontrol surface portion. According to the cushion material of the present disclosure, vibration absorptivity is improved.

In the cushion material according to the present disclosure, it is preferable that the air permeability uncontrol surface portion includes a side formed in the foam body. In this case, improvement in the vibration absorptivity of the cushion material is easily achieved.

In the cushion material according to the present disclosure, it is preferable that the air permeability uncontrol surface portion includes a defective portion of the foam body. In this case, improvement in the vibration absorptivity of the cushion material is easily achieved.

In the cushion material according to the present disclosure, it is preferable that the inflow speed of air flowing into the inside of the foam body during vibration is faster than the outflow speed of air discharged from the inside of the foam body to the outside of the foam body during the vibration. In this case, the cushion material can absorb the vibration without significantly changing the dynamic stiffness of the foam body.

In the cushion material according to the present disclosure, it is the most preferable that the outflow speed of air discharged from the inside of the foam body to the outside of the foam body during vibration is substantially equal to the inflow speed of air flowing into the inside of the foam body during the vibration. In this case, the cushion material has the best vibration absorptivity.

In the cushion material according to the present disclosure, the inflow speed of air flowing into the inside of the foam body during vibration may be slower than the outflow speed of air discharged from the inside of the foam body to the outside of the foam body during the vibration. In this case, the cushion material can absorb the vibration with significantly changing the dynamic stiffness of the foam body.

In the cushion material according to the present disclosure, it is preferable that the covering material includes a sheet member. In this case, the cushion material can be easily manufactured.

In the cushion material according to the present disclosure, it is preferable that the covering material includes a sol substance. In this case, the cushion material can be easily manufactured.

A cushion material manufacturing method according to the present disclosure is a cushion material manufacturing method for obtaining any of the above-described cushion materials, the cushion material manufacturing method including covering the air permeability uncontrol surface portion of the foam body with the covering material. According to the cushion material manufacturing method of the present disclosure, the cushion material with improved vibration absorptivity can be easily obtained.

Advantageous Effect

According to the present disclosure, it is possible to provide the cushion material with improved vibration absorptivity, and the cushion material manufacturing method for easily obtaining the cushion material.

DETAILED DESCRIPTION

With reference to the drawings, cushion materials according to various embodiments of the present disclosure and a cushion material manufacturing method according to an embodiment of the present disclosure will be described below.

[Cushion Material]

Figure 1:
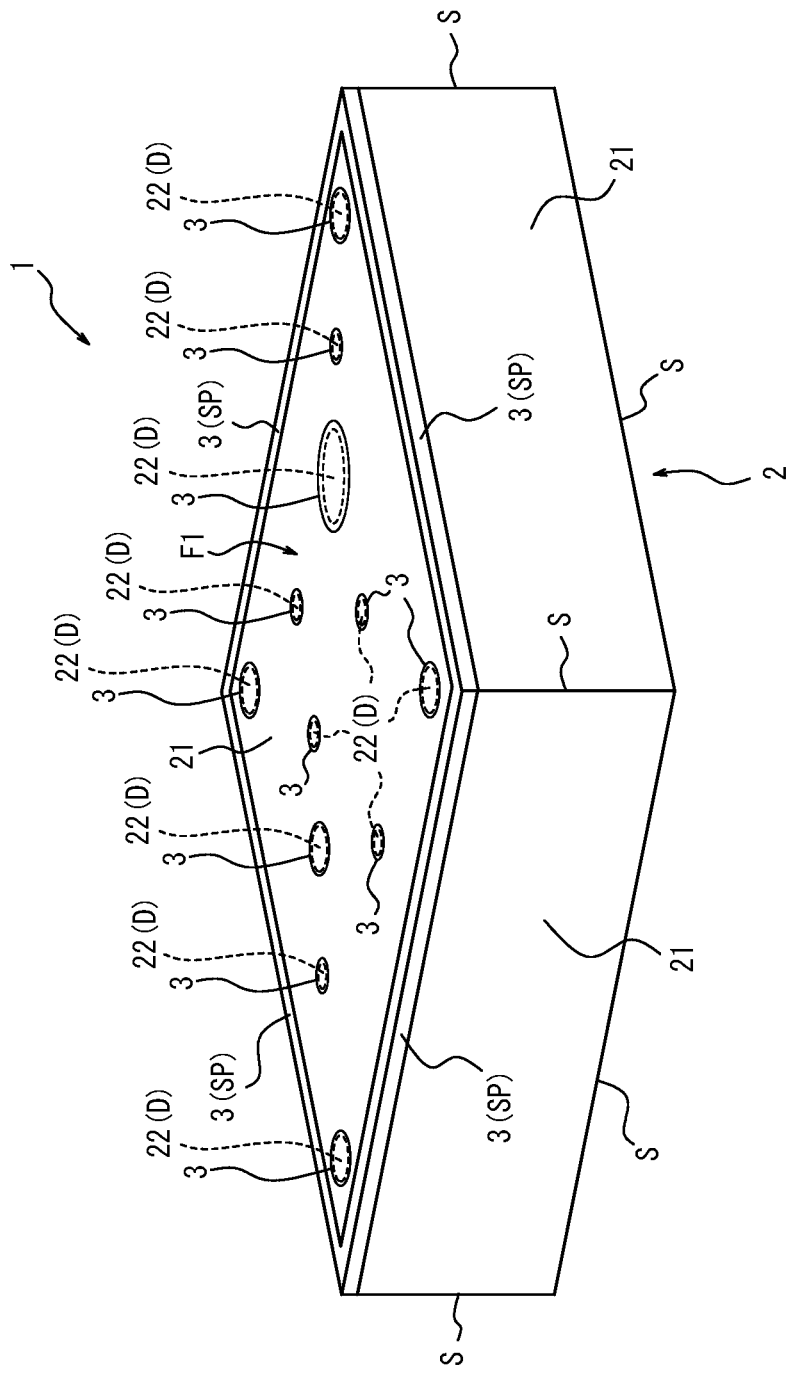
FIG. 1 is a perspective view that schematically illustrates a cushion material according to an embodiment of the present disclosure, viewed from one plane of the cushion material.
Figure 2:
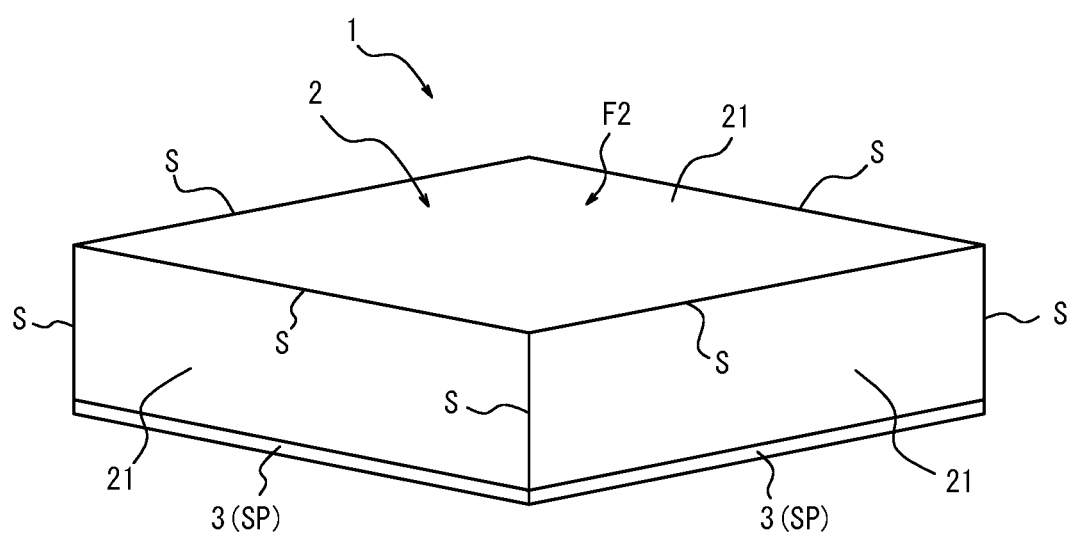
FIG. 2 is a perspective view that schematically illustrates the cushion material of FIG. 1, viewed from the other plane.

In FIG. 1, the reference numeral 1 indicates a cushion material according to an embodiment of the present disclosure. In this embodiment, the cushion material 1 is in the shape of a polyhedron. More specifically, the cushion material 1 is in the shape of a hexahedron (rectangular parallelepiped). FIG. 1 schematically illustrates the cushion material 1 viewed from one plane F1 (hereinafter referred to as "one-sided plane F1") of the cushion material 1. FIG. 2 schematically illustrates the cushion material 1 viewed from the other plane F2 (hereinafter referred to as "other-sided plane F2") of the cushion material 1.

The cushion material 1 includes a foam body 2. A surface portion 20 of the foam body 2 is formed of an air permeability control surface portion 21 and an air permeability uncontrol surface portion 22.

In this embodiment, the foam body 2 is a foam-molded body that has been foam-molded. Here, foam molding is a molding method in which a molding material supplied into a molding die is foamed to obtain a molded body within the molding die. In this embodiment, the surface portion 20 of the foam body 2 refers to a surface portion of the entire surface of the foam body 2. In this embodiment, the foam body 2 is in the shape of a polyhedron. More specifically, the foam body 2 is in the shape of a rectangular parallelepiped (hexahedron). In this embodiment, the surface portion 20 of the foam body 2 includes surface portions of all six faces of the foam body 2.

In this embodiment, the air permeability control surface portion 21 is a surface portion for controlling the air permeability between the inside of the foam body 2 and the outside of the foam body 2. In this embodiment, the air permeability control surface portion 21 preferably controls the air permeability so that the inside of the foam body 2 tends to be sealed. In this embodiment, when the air permeability control surface portion 21 is cut out up to 10 mm from a surface of the air permeability control surface portion 21 and the air permeability AR1 (hereinafter also referred to as "surface air permeability AR1") of the air permeability control surface portion 21 is measured in compliance with JIS K 6400, the surface air permeability AR1 is 25 cc/cm$^2$/sec or less.

In this embodiment, the air permeability uncontrol surface portion 22 is a surface portion that cannot control air permeability, or a surface portion the air permeability of which is not controlled.

Figure 3:
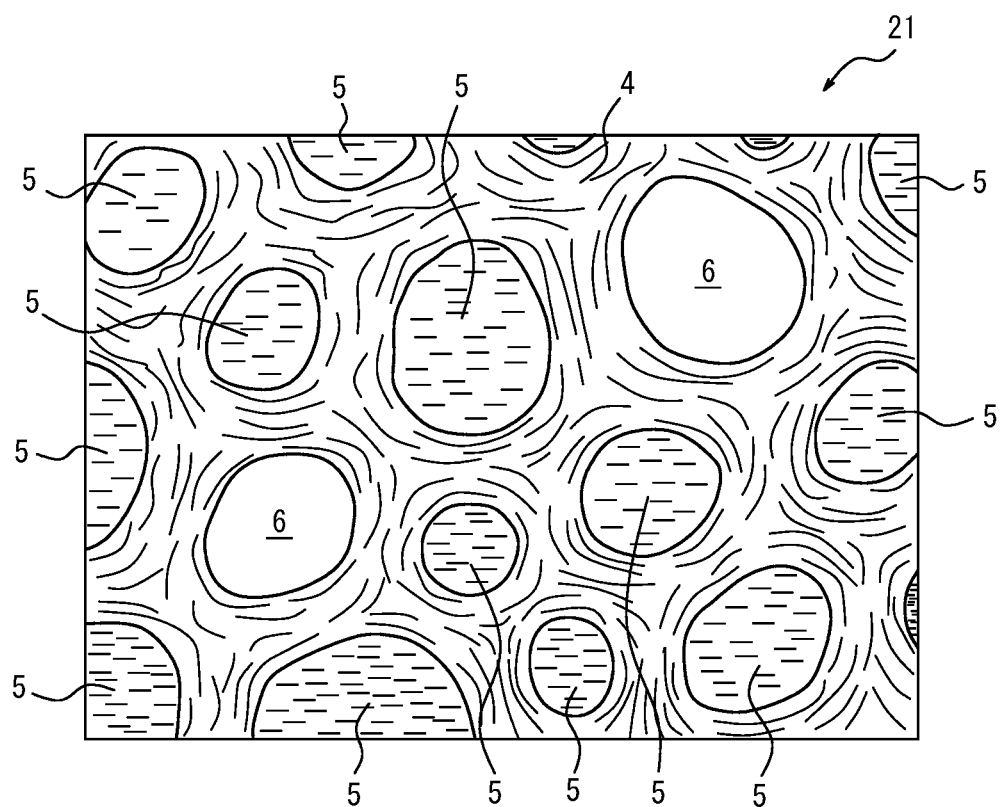
FIG. 3 is a drawing that schematically illustrates a surface of an air permeability control surface portion of a foam body configuring the cushion material of FIG. 1.

FIG. 3 is a drawing that schematically illustrates the surface of the air permeability control surface portion 21 that satisfies the above-described surface air permeability AR1.

With reference to FIG. 3, most of the surface of the air permeability control surface portion 21 is occupied with closed portions in which cell membranes 5 are formed on a cell frame 4 without breaking, but there are also opening portions 6 in which no cell membrane 5 is formed on the cell frame 4. With reference to FIG. 3, in this embodiment, the surface of the air permeability control surface portion 21 has a small percentage of the opening portions 6 compared to the closed portions closed by the cell membranes 5.

Figure 4:
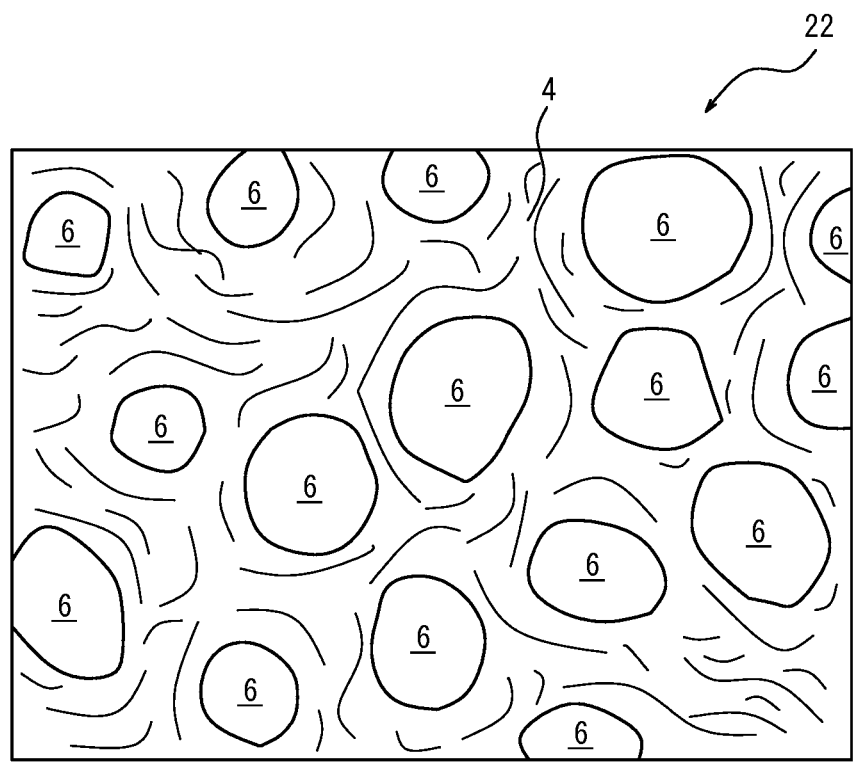
FIG. 4 is a drawing that schematically illustrates a surface of an air permeability uncontrol surface portion of the foam body configuring the cushion material of FIG. 1.

In contrast, FIG. 4 is a drawing that schematically illustrates a surface of the air permeability uncontrol surface portion 22. In this embodiment, the air permeability uncontrol surface portion 22 is a surface portion of a resin foam body obtained by supplying a molding material into a general molding die and performing foam molding.

With reference to FIG. 4, most of the surface of the air permeability uncontrol surface portion 22 is occupied with opening portions 6 in which cell membranes 5 are not formed. In this case, improvement in the air permeability brings about increase in vibration transmissibility, thus resulting in reduction in vibration absorptivity.

In contrast, the cushion material 1 includes a covering material 3. The covering material 3 covers the air permeability uncontrol surface portion 22. The material and shape (form) of the covering material 3 are not limited as long as the covering material 3 can cover the air permeability uncontrol surface portion 22. Examples of the covering material 3 include, for example, a sheet member such as masking tape, and a sol material such as rubber (e.g., latex rubber) and resin (especially, non-air permeable non-foam polyurethane resin). In the embodiment, the covering material 3 functions as an air permeability control material. In this embodiment, as the covering material 3, a covering material with lower air permeability than the air permeability uncontrol surface portion 22 is used.

With reference to FIG. 1, in this embodiment, the air permeability control surface portion 21 occupies almost entirety of the surface portion 20. On the other hand, in this embodiment, the air permeability uncontrol surface portion 22 occupies a small percentage of the surface portion 20.

Figure 6:
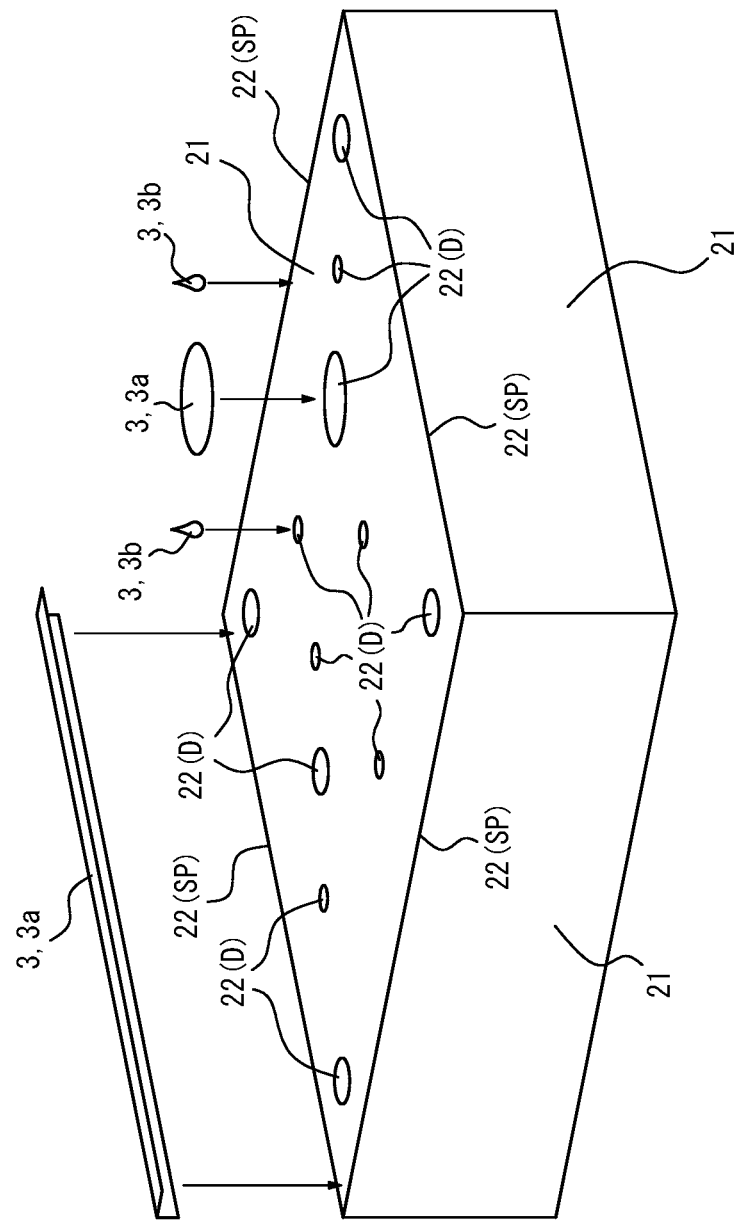
FIG. 6 is a perspective view that schematically illustrates a foam body taken out of the molding die of FIG. 5, viewed from one plane, and is a perspective view that explains the cushion material manufacturing method, using the foam body, according to an embodiment of the present disclosure.

The air permeability uncontrol surface portion 22 includes sides S formed in the foam body 2. With reference to FIG. 6, in this embodiment, the air permeability uncontrol surface portion 22 includes four sides SP bordering the one-sided plane F1, out of sixteen sides S forming the foam body 2.

With reference to FIG. 6, in this embodiment, the air permeability uncontrol surface portion 22 includes the four sides SP that border the one-sided plane F1, out of the sixteen sides S forming the foam body 2, and defective portions D that are dotted about the one-sided plane F1. The air permeability uncontrol surface portion 22 also includes the defective portions D of the foam body 2. With reference to FIG. 6, in this embodiment, the air permeability uncontrol surface portion 22 includes the defective portions D that are dotted about the one-sided plane F1. Specifically, the air permeability uncontrol surface portion 22 includes a plurality (twelve, in this example) of defective portions D formed in the one-sided plane F1. Examples of the defective portions D include, for example, recesses and scars. The recesses include, for example, voids caused by gas accumulation (bubbles) in the molding die, and dents caused by vent holes of the molding die.

The foam body 2 produces an air-damping effect by restricting air flows in and out of the foam body 2. The cushion material 1 absorbs vibration mainly by using the air-damping effect of the foam body 2.

In the cushion material 1 according to this embodiment, the covering material 3 covers the air permeability uncontrol surface portion 22, and as a result, air permeability is controlled on all the six faces of the foam body 2. In other words, the surface portion 20 of the foam body 2 seals the inside of the foam body 2, so that air flows in and out of the cushion material 1 are evenly restricted over the entire surface of the foam body 2. Therefore, according to this embodiment, the air-damping effect, i.e., vibration absorptivity is improved compared to a conventional cushion material in which an air permeability uncontrol surface portion 22 remains. Therefore, according to the cushion material 1 of this embodiment, the vibration absorptivity is improved.

In addition, as described below, the cushion material 1 of this embodiment can lower the peak value (resonance magnification) of vibration transmissibility with respect to vibration frequency, and shift the vibration frequency of the peak value to a high frequency side.

According to the present disclosure, it is preferable that the air permeability uncontrol surface portion 22 includes the sides S formed in the foam body 2. The sides S of the foam body 2, for example, correspond to a parting line during foam molding in the molding die, and thus the air permeability of the sides S is often difficult to control. Therefore, by assuming the sides S of the foam body 2 to be the surface portion 20 the air permeability of which is difficult to control and by covering the sides S of the foam body 2 with the covering material 3, air permeability is easily controlled on the entire surface portion 20 of the foam body 2 so that the air permeability of the entire surface portion 20 of the foam body 2 is controlled. Therefore, in this case, the cushion material 1 can be a cushion material the vibration absorptivity of which is easily improved.

In this embodiment, the air permeability uncontrol surface portion 22 includes the sides SP formed in the foam body 2. As described below, the sides SP of the foam body 2 correspond to portions in which a parting line is formed during foam molding in the molding die, and thus are often difficult to control air permeability. In contrast, as illustrated in FIG. 1, for example, in this embodiment, the sides SP of the foam body 2 are covered with the covering material 3. Therefore, the cushion material 1 according to this embodiment can be a cushion material the vibration absorptivity of which is easily improved.

According to the present disclosure, it is preferable that the air permeability uncontrol surface portion 22 includes the defective portions D of the foam body 2. The defective portions D are caused by unexpected phenomena such as bubbles generated during foam molding in the molding die, and thus the air permeability of the defective portions D is difficult to control. Therefore, by assuming the defective portions D of the foam body 2 to be the surface portion 20 the air permeability of which is difficult to control and by covering the defective portions D of the foam body 2 with the covering material 3, air permeability is easily controlled on the entire surface portion 20 of the foam body 2 so that the air permeability of the entire surface portion 20 of the foam body 2 is controlled. Therefore, in this case, the cushion material 1 can be a cushion material the vibration absorptivity of which is easily improved.

In this embodiment, the air permeability uncontrol surface portion 22 includes the defective portions D of the foam body 2. As described above, the air permeability of the defective portions D of the foam body 2 is difficult to control. In contrast, for example, as illustrated in FIG. 1, in this embodiment, the defective portions D of the foam body 2 are covered with the covering material 3. Therefore, the cushion material 1 according to this embodiment can be a cushion material the vibration absorptivity of which is easily improved.

By the way, the cushion material 1 of this embodiment is designed to have an air-cushioning effect by making the inside of the foam body 2 tend to be sealed. Therefore, the cushion material 1 can be made to have different characteristics by controlling (adjusting) air supply and discharge amounts of the foam body 2. Specifically, the performance of the cushion material 1 can be divided into the following three modes.

(Mode M1)

It is preferable for the cushion material 1 that the inflow speed S3 of air flowing into the inside of the foam body 2 during vibration is faster than the outflow speed S1 of air discharged from the inside of the foam body 2 to the outside of the foam body 2 during the vibration. In other words, it is preferable for the cushion material 1 that inflow time t3 of air flowing into the inside of the foam body 2 during vibration is shorter than outflow time t1 of air discharged from the inside of the foam body 2 to the outside of the foam body 2 during the vibration. In any of these cases, the cushion material 1 can be a cushion material that can absorb the vibration without significantly changing the dynamic stiffness of the foam body 2. The "dynamic stiffness of the foam body" refers to the inherent dynamic stiffness of the foam body that changes in response to a load when only the foam body 2 without the covering material is subjected to the load.

In the cushion material 1, in a case in which the inflow speed S3 of air flowing into the inside of the foam body 2 during restoration of vibration is faster than the outflow speed S1 of air discharged from the inside of the foam body 2 during compression of the vibration, the air-damping effect of the foam body 2 tends to prevent the dynamic stiffness of the foam body 2 from becoming too stiff. In addition, as described above, the same applies to a case in which the inflow time t3 of air flowing into the inside of the foam body 2 during compression of vibration is shorter than the outflow time t1 of air discharged from the inside of the foam body 2 to the outside of the foam body 2 during restoration of the vibration. Therefore, in any of these cases, it is possible to absorb the vibration without significantly changing the dynamic stiffness of the foam body 2.

(Mode M2)

In addition, in the cushion material 1, the outflow speed S1 of air discharged from the inside of the foam body 2 to the outside of the foam body 2 during vibration should be substantially equal to the inflow speed S3 of air flowing into the inside of the foam body 2 during the vibration, and it is more preferable that the outflow speed S1 of air discharged from the inside of the foam body 2 during vibration is equal to the inflow speed S3 of air flowing into the inside of the foam body 2 during the vibration. In other words, in the cushion material 1, the outflow time t1 of air discharged from the inside of the foam body 2 to the outside of the foam body 2 during vibration should be substantially equal to the inflow time t3 of air flowing into the inside of the foam body 2 during the vibration, and it is more preferable that the outflow time t1 of air is equal to the inflow time t3 during the vibration. In any of these cases, the cushion material 1 can be a cushion material with the best vibration absorptivity.

In the cushion material 1, in a case in which the inflow speed S3 of air flowing into the inside of the foam body 2 during restoration of vibration is equal to the outflow speed S1 of air discharged from the inside of the foam body 2 during compression of the vibration, the air-damping effect of the foam body 2 tends to minimize the resonance magnification without significantly changing the dynamic stiffness of the foam body 2. In addition, as described above, the same applies to a case in which the outflow time t3 of air flowing into the outside of the foam body 2 from the inside of the foam body 2 during restoration of vibration is equal to the inflow time t1 of air discharged to the inside of the foam body 2 during compression of the vibration. Therefore, in any of these cases, the cushion material 1 can be a cushion material with the best vibration absorptivity.

(Mode M3)

In addition, in the cushion material 1, the inflow speed S3 of air flowing into the inside of the foam body 2 during vibration may be slower than the outflow speed S1 of air discharged from the inside of the foam body 2 to the outside of the foam body 2 during the vibration. In other words, in the cushion material 1, the inflow time t3 of air flowing into the inside of the foam body 2 during vibration may be longer than the outflow time t1 of air discharged from the inside of the foam body 2 to the outside of the foam body 2 during the vibration. In any of these cases, the cushion material 1 can be a cushion material that can absorb the vibration with significantly changing the dynamic stiffness of the foam body 2.

In the cushion material 1, in a case in which the inflow speed S3 of air flowing into the inside of the foam body 2 during restoration of vibration is slower than the outflow speed S1 of air discharged from the inside of the foam body 2 during compression of the vibration, the air-damping effect of the foam body 2 tends to significantly change the dynamic stiffness of the foam body 2. In addition, as described above, the same applies to a case in which the inflow time t3 of air flowing into the inside of the foam body 2 during restoration of vibration is longer than the outflow time t1 of air discharged from the inside of the foam body 2 during compression of the vibration. Therefore, in any of these cases, it is possible to absorb the vibration with significantly changing the dynamic stiffness of the foam body 2.

Specifically, a test piece (for example, iron grinder) may push down against the cushion material 1, and then the test piece may be pulled up. In this case, the test piece first pushes down against the cushion material 1 from an initial state (no-load state), in which the cushion material 1 is not compressed, until a time T has elapsed (pushing down step). Thereby, the test piece compresses the cushion material 1 from the initial state over a period of time T. Next, the test piece is pulled up from a maximum compressed state, in which the pushing down against the cushion material 1 is stopped, also over a period of time T (pulling up step). This restores the cushion material 1 over the same time T as the pushing down step.

$Vo(0)$ represents the total volume of air held inside the cushion material 1 when the cushion material 1 is in the initial state. $Vo(1)$ represents the volume of air discharged from the cushion material 1 until the cushion material 1 is compressed from the initial state to the maximum compressed state. $Vo(2)$ represents the volume of air that is compressed inside the cushion material 1 after the cushion material 1 is compressed from the initial state to the maximum compressed state. In this case, $Vo(2)=Vo(0)-Vo(1)$. Also, $Vo(3)$ represents the volume of air flowing into the cushion material 1 until the cushion material 1 is restored from the maximum compressed state to the initial state. In this case, since the cushion material 1 is restored to the initial state, $Vo(3)=Vo(0)-Vo(2)=Vo(1)$.

On the other hand, t1 represents the time until the cushion material 1 is compressed from the initial state to the maximum compressed state. S1 represents the outflow speed of air until the cushion material 1 is compressed from the initial state to the maximum compressed state. Then, S3 represents the inflow speed of air until the cushion material 1 is restored from the initial state to the maximum compressed state. Also, t3 represents the time until the cushion material 1 is restored from the maximum compressed state to the initial state.

In the above mode M1, S1<S3 (t1>t3).
In the above mode M2, S1=S3 (t1=t3).
In the above mode M3, S1>S3 (t1<t3).

According to the present disclosure, it is preferable that the covering material 3 includes a sheet member 3a. In this case, the cushion material can be easily manufactured. In this embodiment, the covering material 3 includes sheet members 3a. In this case, the cushion material 1 can be a cushion material that can be easily manufactured by simply attaching the sheet members 3a.

According to the disclosure, it is preferable that the covering material 3 includes a sol substance 3b. In this case, the cushion material can be easily manufactured. In this embodiment, the covering material 3 includes the sol substance 3b. In this case, the cushion material 1 can be a cushion material that can be easily manufactured by simply applying or dropping the sol substance 3b. In particular, the covering material 3 of the sol substance 3b is effective for covering a narrow area of the air permeability uncontrol surface portion 22. The sol substance 3b can keep its sol state, or solidify.

[Cushion Material Manufacturing Method]

Next, a cushion material manufacturing method according to an embodiment of the present disclosure will be described.

Figure 5:
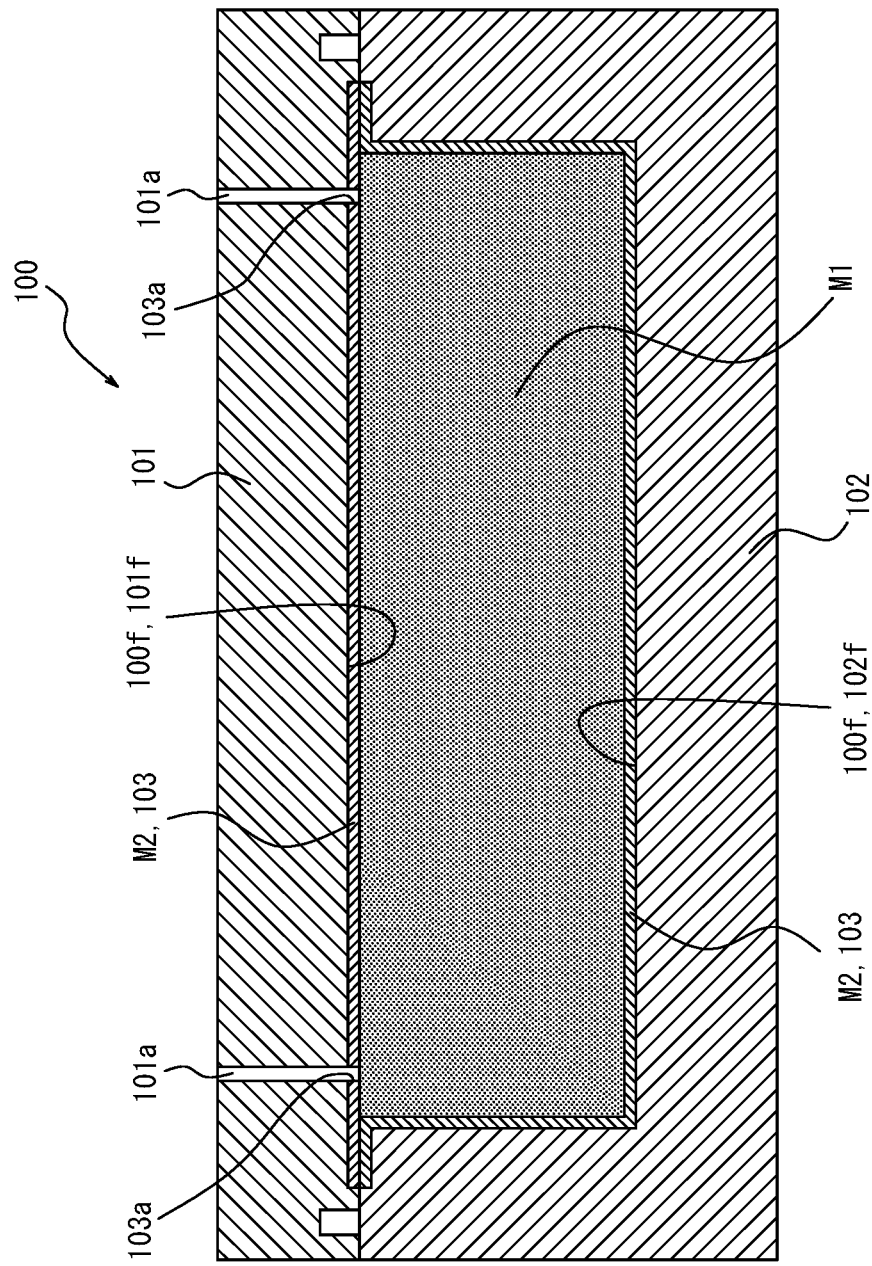
FIG. 5 is a cross sectional view that schematically illustrates a molding die that can be used in a cushion material manufacturing method for obtaining the cushion material of FIG. 1.

With reference to FIG. 5, the seat pad manufacturing method according to this embodiment is a cushion material manufacturing method for obtaining the cushion material 1 by supplying a molding material M1 into a molding die 100 and performing foam molding.

With reference to FIG. 5, the reference numeral 100 indicates the molding die that can be used in the manufacturing method of the cushion material 1. An inner surface 100f of the molding die 100 forms a cavity into which the molding material M1 is supplied and in which foam molding is performed. The inner surface 100f of the molding die 100 is covered with resin M2. As the resin M2, PS (polystyrene) or PE (polyethylene) can be used. Furthermore, as PE, HDPE (high-density polyethylene) or LDPE (low-density polyethylene) can be used. In this embodiment, HDPE is used as the resin M2.

Also, with reference to FIG. 5, in this example, the molding die 100 has an upper die 101 and a lower die 102. The inner surface 100f of the molding die 100 is formed of an inner surface 101f of the upper die 101 and an inner surface 101f of the lower die 102. In this embodiment, the upper die 101 is formed with vent holes 101a to vent gas generated in the cavity. In this example, the resin M2 is formed of a film member (film sheet) 103. In this embodiment, in the film member 103, openings 103a to allow the vent holes 101a to pass through to the cavity are formed. Thereby, the cavity can be made accessible to the outside of the molding die 100.

The cushion material manufacturing method according to this embodiment can be outlined as follows.

[Molding Die Placing Step]

With reference to FIG. 5, the inner surface 101f of the upper die 101 and the inner surface 101f of the lower die 102 are each covered with the resin M2. In this embodiment, each of the inner surface 101f of the upper die 101 and the inner surface 101f of the lower die 102 is covered with the film member 103 made of the resin M2. Then, as illustrated in FIG. 5, the upper die 101 and lower die 102 are combined to form the cavity, which is partitioned by the two film members 103, inside the molding die 100.

[Foam Molding Step]

Next, as illustrated in FIG. 5, the molding material M1 is injected into the cavity partitioned by the two film members 103 formed inside the molding die 100, and the molding material M1 is heated and foamed. Thereafter, the molding die 100 is clamped and foam molding is performed inside the molding die 100. The molding material M1 is foam resin. The foam resin is preferably soft polyurethane. The molding material M1 is, for example, soft foamed polyurethane in which a foaming agent is mixed with soft polyurethane resin. However, according to the present disclosure, various types of foam resin can be used as the molding material M1.

[Die Opening Step]

After the foam molding is completed, the molding die 100 is opened and separated into the upper die 101 and the lower die 102. Thereby, the foam body 2 the surface portion 20 of which is formed of the air permeability control surface portion 21 can be obtained.

In this way, when the molding die 100 the inner surface 100f of which is covered with the resin M2 is used as the molding die 100, the foam body 2 the surface portion 20 of which is formed of the air permeability control surface portion 21 can be easily obtained by a simple procedure of just covering the inner surface 100f of the molding die 100 with the resin M2.

[Covering Step]

In particular, the cushion material manufacturing method according to this embodiment includes the step of covering the air permeability uncontrol surface portion 22 of the foam body 2 with the covering material 3. In this embodiment, this step is performed after the foam body 2 is taken out of the molding die 100.

FIG. 6 is a perspective view that schematically illustrates the foam body 2 taken out of the molding die 100. As illustrated in FIG. 6, the surface portion 20 of the foam body 2 actually includes the air permeability uncontrol surface portion 22.

In the cushion material manufacturing method according to this embodiment, the air permeability uncontrol surface portion 22 includes four sides SP formed in the foam body 2. In this embodiment, the four sides SP are four sides SP that border the one-sided plane F1 of the foam body 2. According to the manufacturing method of this embodiment, the four sides SP are formed at positions corresponding to a parting line formed between the upper die 101 and the lower die 102. In other words, according to the manufacturing method of this embodiment, the four sides SP formed in the foam body 2 are formed at positions of a mating face between the two film members 103.

On the other hand, in the manufacturing method of this embodiment, the air permeability control surface portion 21 of the foam body 2 is formed in a portion in which the molding material M1 contacts the film member 103 (resin M2). However, in the case of attempting contact with the molding material M1 at the mating face between the two film members 103, the contact may not be successful. According to the manufacturing method of this embodiment, the mating face between the two film members 103 forms the four sides SP bordering the one-sided plane F1 of the foam body 2. Therefore, according to this embodiment, the four sides SP bordering the one-sided plane F1 of the foam body 2 may become the air permeability uncontrol surface portion 22.

In this embodiment, the air permeability uncontrol surface portion 22 includes the defective portions D of the foam body 2. In this embodiment, the defective portions D include voids (recesses) formed by the gas (bubbles) generated in the cavity and dents (recesses) generated by the openings 103a formed in the film member 103. At the defective portions D, the molding material M1 does not contact the film member 103. Therefore, in this embodiment, the defective portions D of the foam body 2 may also become the air permeability uncontrol surface portion 22.

According to the manufacturing method of this embodiment, the sheet member 3a can be attached to at least one side SP, out of the four sides SP formed in the foam body 2. Thereby, at least one of the four sides SP is sealed by the sheet member 3a. Also, according to the manufacturing method of this embodiment, the sol substance 3b can be applied or dropped onto at least one side SP, out of the four sides SP formed in the foam body 2. Thereby, at least one of the four sides SP is sealed by the sol substance 3b. That is, according to the manufacturing method of this embodiment, every side SP of the four sides SP formed in the foam body 2 can be sealed by the sheet member 3a and/or the sol substance 3b.

Likewise, according to the manufacturing method of this embodiment, the sheet member 3a can be attached to at least one of the plurality of defective portions D of the foam body 2. Thereby, at least one of the defective portions D of the foam body 2 is sealed by the sheet member 3a. Also, according to the manufacturing method of this embodiment, the sol substance 3b can be applied or dripped onto at least one defective portion D, out of the plurality of defective portions D of the foam body 2. Thereby, at least one of the defective portions D of the foam body 2 is sealed by the sol substance 3b. That is, according to the manufacturing method of this embodiment, every defective portion D of the foam body 2 can be sealed by the sheet member 3a and/or the sol substance 3b.

Thus, according to the cushion material manufacturing method of this embodiment, the entire surface portion 20 of the foam body 2 can be made to function as the air permeability control surface portion 21 by simple process of just covering the air permeability uncontrol surface portion 22 of the foam body 2 with the covering material 3. Therefore, according to the cushion material manufacturing method of this embodiment, the cushion material 1 with improved vibration absorptivity can be easily obtained.

[Seat Pad]

Figure 7:
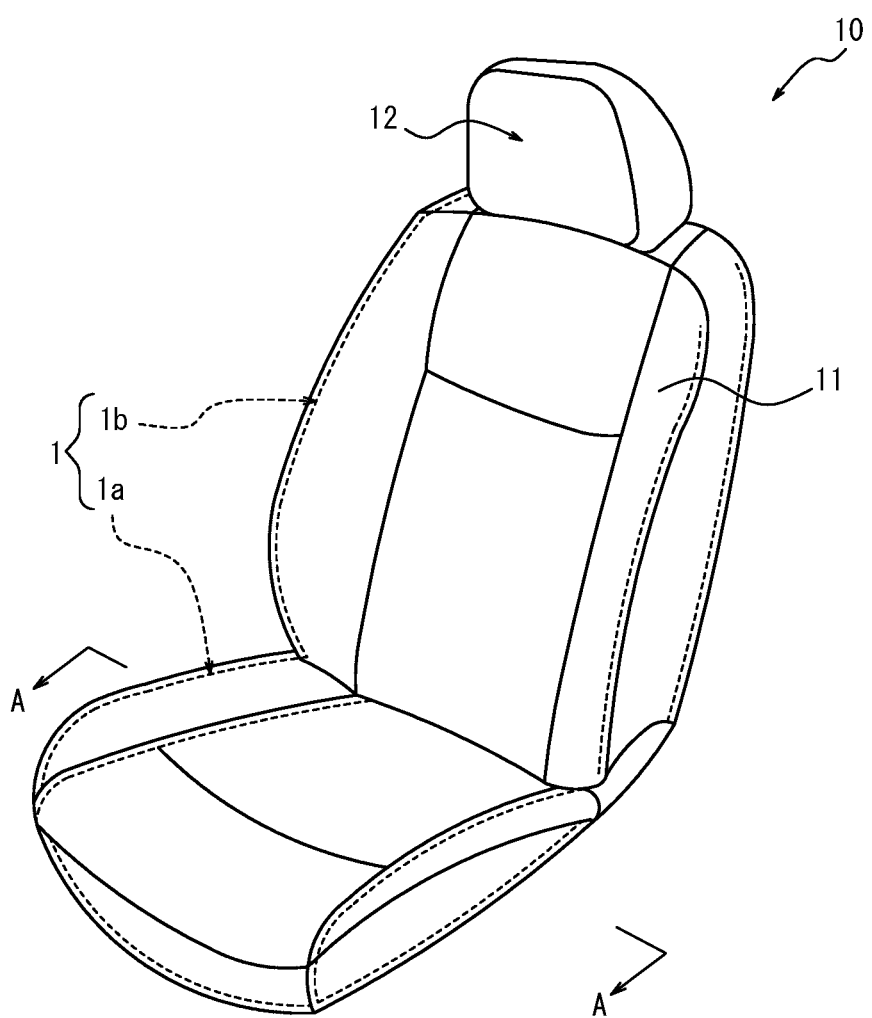
FIG. 7 is a perspective view that schematically illustrates a seat including a cushion material according to another embodiment of the present disclosure.
Figure 8:
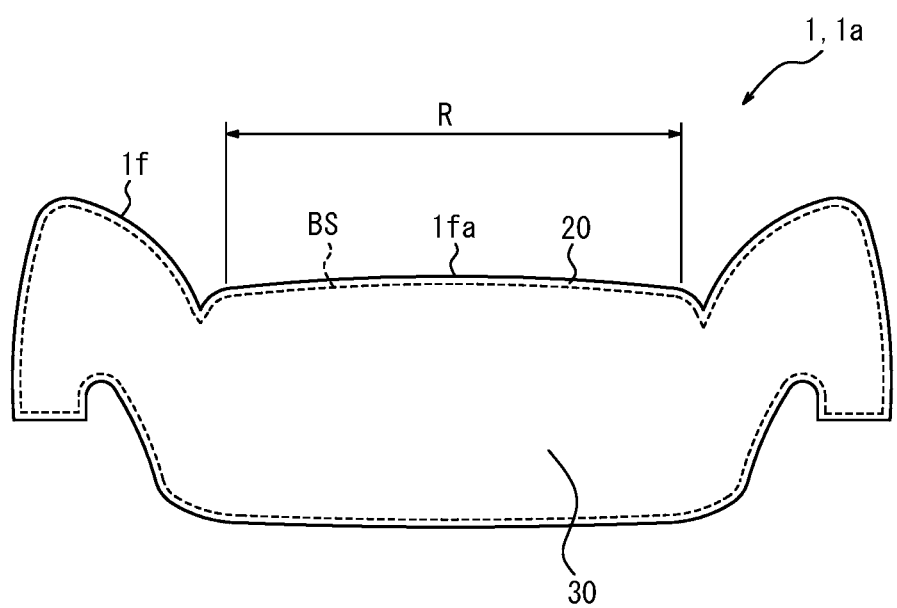
FIG. 8 is a cross sectional view of the cushion material of FIG. 7, along the section A-A of FIG. 7.

FIG. 7 is a perspective view that schematically illustrates a seat 10 with a cushion material 1 according to another embodiment of the present disclosure. The cushion material 1 according to this embodiment is a seat pad. FIG. 8 is a cross sectional view of the cushion material 1, along the section A-A of FIG. 7.

In the example of FIG. 7, the seat 10 is a seat for an automobile. The seat 10 is provided with the cushion material 1. In FIG. 7, the cushion material 1 is indicated by dashed lines. The cushion material 1 of this embodiment has a cushion pad 1a for a person to sit on, and a back pad 1b to support the back of the seated person. In this example, the seat 10 further has a surface skin 11 covering a front side of the cushion material 1, and a frame (not illustrated) supporting the cushion pad 1*a* from below, a frame (not illustrated) installed on a back side of the back pad 1*b*, and a headrest 12 to support the head of the seated person. The surface skin 11 is made of, for example, a material with good air permeability (cloth or the like).

The cushion material 1 according to this embodiment also has a foam body 2 and a covering material 3. In this embodiment, the foam body 2 is preferably a resin foam body formed by foaming and molding soft resin, as a molding material M1. As the molding material M1, soft polyurethane foam is preferable. In this embodiment, the cushion pad 1*a* and the back pad 1*b* are configured separately from each other. However, the cushion pad 1*a* and the back pad 1*b* may be formed integrally.

With reference to FIG. 8, the reference numeral 1*f* indicates a surface of the cushion material 1. In the cushion material 1 of this embodiment, when a surface portion 21 up to 10 mm from a surface of the air permeability control surface portion 21 is cut out and the air permeability AR1 of the surface portion 21 (hereinafter also referred to as "surface air permeability AR1") is measured in compliance with JIS K 6400, the surface air permeability AR1 is 25 $cc/cm^2/sec$ or less.

In FIG. 8, the reference numeral BS indicates an interface between a surface portion 20 and a core portion 30, which is inside the surface portion 20. In FIG. 8, the interface BS is indicated by a dashed line. A seat region R is a region to which a downward load is applied when the person sits on the seat 10. The seat region R extends in the front and back directions of the drawing (depth direction of the drawing), in addition to the left and right directions of the drawing. In this embodiment, as illustrated in FIG. 2, a seat region side surface 1*fa* is a smooth surface.

Also, according to this embodiment, when the core portion 30 inside the surface portion 20 is cut out and the air permeability AR2 of the core portion 30 (hereinafter also referred to as "core air permeability AR2") is measured in compliance with JIS K 6400, it is preferable that the air permeability AR2 is greater than the air permeability AR1 of the surface portion 20. In this case, heat transmitted through the surface portion 20 is efficiently released to the core portion 30, thereby further improving thermal comfort.

According to the present disclosure, the air permeability AR2 of the core portion 30 can be equal to or greater than the surface air permeability AR1. In this case, air-damping effect is increased, which further improves vibration absorptivity.

[Test Results]

Next, test results for cushion materials of examples of the present disclosure will be described, using comparative examples.

Figure 9:
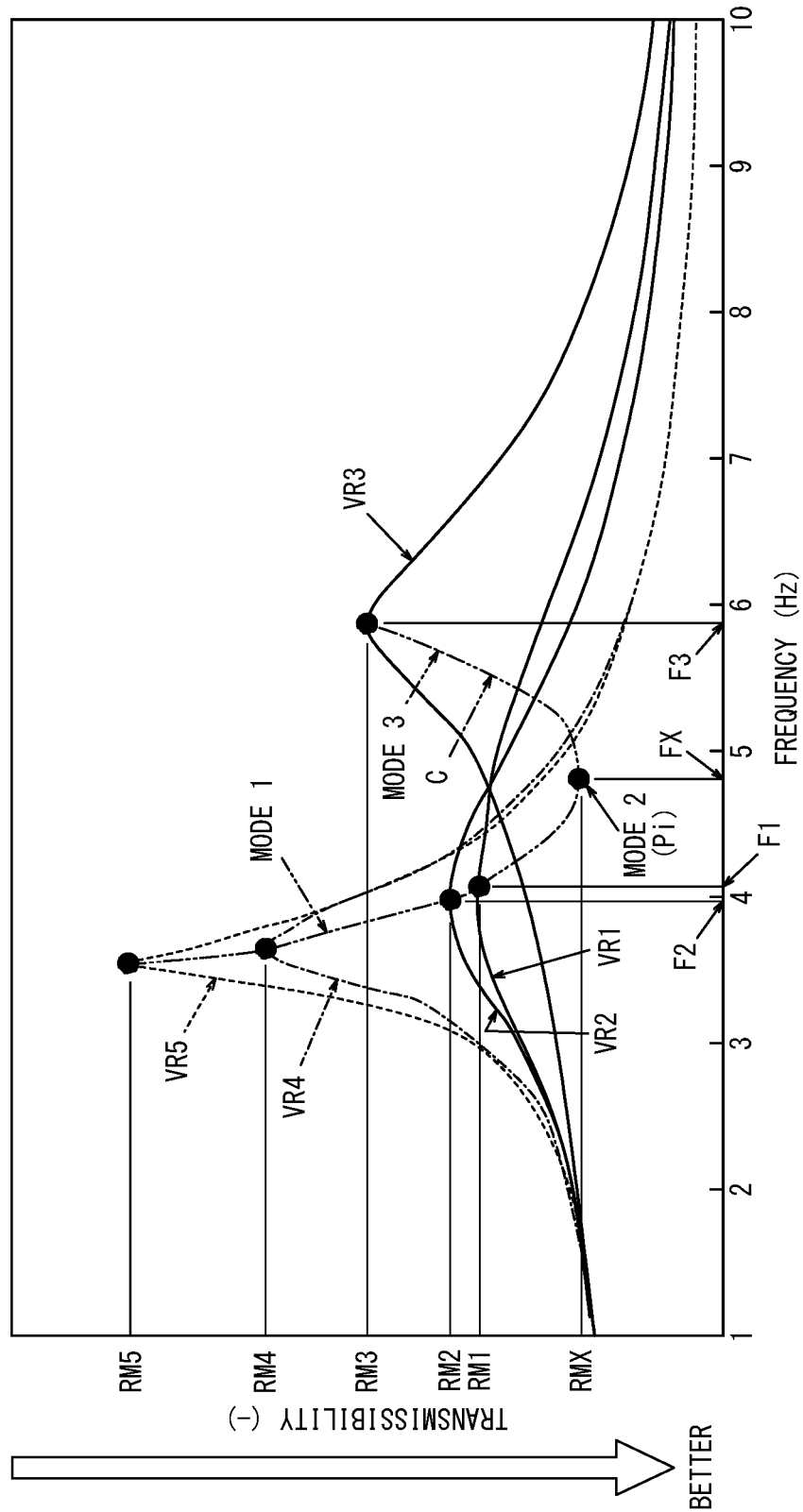
FIG. 9 is a graph that schematically illustrates the vibration transmissibility of cushion materials of examples of the present disclosure and cushion materials of Comparative Examples 1 and 2, with respect to vibration frequency.

FIG. 9 is a graph that schematically illustrates the vibration transmissibility VR of each of the cushion materials of the examples of the present disclosure and cushion materials of Comparative Examples 1 and 2, with respect to vibration frequency. The vibration transmissibility VR is the vibration transmissibility of the cushion material with respect to vibration frequency. Here, the vibration transmissibility VR was measured in compliance with the JASO B-407 standards. RM represents the resonance magnification (peak value of the vibration transmissibility VR).

Comparative Example 1 was a cushion material made of a foam body that was foam-molded using only a molding die (hereinafter also referred to as "first comparative example cushion material"). Comparative Example 2 was a cushion material made of a foam body that was foam-molded using a molding die covered with resin (hereinafter also referred to as "second comparative example cushion material"). Examples 1 to 3 were cushion materials in which the foam bodies 2 the air permeability of which was controlled were covered with the covering material 3 (hereinafter also referred to as "example cushion materials"). Specifically, Example 1 was a first example cushion material of the foam body 2 with high air permeability. Example 2 was a second example cushion material with less air permeability than Example 1. Example 3 was a third example cushion material with less air permeability than Example 2.

In FIG. 9, the reference numeral VR1 represents the vibration transmissibility of the first example cushion material. The reference numeral VR2 represents the vibration transmissibility of the second example cushion material. The reference numeral VR3 represents the vibration transmissibility of the third example cushion material. The reference numeral VR4 represents the vibration transmissibility of the second comparative example cushion material. The reference numeral VR5 represents the vibration transmissibility of the first comparative example cushion material.

In FIG. 9, the test results of the vibration transmissibility VR1 to VR3 obtained from Examples 1 to 3 are indicated by solid lines. The test result of the vibration transmissibility VR4 obtained from the second comparative example cushion material is indicated by a single dotted line. Furthermore, the test result of the vibration transmissibility VR5 obtained from the first comparative example cushion material is indicated by a dashed line.

With reference to FIG. 9, the resonance magnification RM4 of the second comparative example cushion material is lower than the resonance magnification RM5 of the first comparative example cushion material. According to these results, the vibration absorptivity of the cushion material is improved when the air permeability of the surface portion of the foam body was controlled than when the air permeability of the surface portion of the foam body was not controlled.

Also, with reference to FIG. 9, the resonance magnification RM1 of the first example cushion material, the resonance magnification RM2 of the second example cushion material, and the resonance magnification RM3 of the third example cushion material are all lower than the resonance magnification RM4 of the second comparative example cushion material. According to these results, the vibration absorptivity of the cushion material is improved when the air permeability of the surface portion 20 of the foam body 2 was controlled and then the air permeability uncontrol surface portion 22 the air permeability of which was not controlled was covered with the covering material 3 than when only the air permeability of the surface portion 20 of the foam body 2 was controlled. These results can be attributed to the fact that the inside (core portion) of the foam body 2 was sealed more securely by further covering the foam body 2, the air permeability of which was controlled, with the covering material 3. In other words, the above results are thought to be due to the fact that the air-cushioning effect of the foam body 2 was improved by further covering the foam body 2, the air permeability of which was controlled, with the covering material 3.

Therefore, it is apparent from the above results that when the air permeability uncontrol surface portion 22 of the foam body 2 was covered with the covering material 3, as in the present disclosure, the vibration absorptivity of the cushion material was improved compared to the first and second comparative examples.

By the way, with reference to FIG. 9, the resonance magnification RM3 of the third example cushion material is higher than the resonance magnification RM1 of the first example cushion material. These results are thought to be due to the fact that, even in a case in which the foam body 2 the air permeability of which was controlled was covered with the covering material 3, the air permeability of the foam body 2 was restrained too much.

According to the results of FIG. 9, the resonant frequency F1 of the first example cushion material shifts to the higher frequency side than the resonant frequency F2 of the second example cushion material. Furthermore, the resonant frequency F3 of the third example cushion material shifts to the higher frequency side than the resonant frequency F1 of the first example cushion material. It is found from these results that, in a case in which the foam body 2 the air permeability of which was controlled was covered with the covering material 3, when the air permeability of the foam body 2 was restrained, the more restrained the air permeability of the foam body 2, the higher the resonance frequency of the example cushion material.

On the other hand, the performance of the cushion material is considered to be affected by the air-cushioning effect of the foam body 2. The air-cushioning effect is thought to be defined by the relationship between the amount of air discharged from the inside of the foam body 2 to the outside of the foam body 2 during vibration and the amount of air compressed inside the foam body 2 during the vibration.

Furthermore, it is thought that, in consideration of a flow of air discharged outside the foam body 2 during vibration and a flow of air compressed inside the foam body 2 during the vibration, the air-cushioning effect can be defined by a quadratic curve. The inflection point of the quadratic curve is considered to be the point at which the amount of air discharged from the inside of the foam body 2 to the outside of the foam body 2 during vibration is equal to the amount of air compressed inside the foam body 2 during the vibration.

Considering the above, the resonance magnification RM of the cushion material of the present disclosure varies according to the relationship between the amount of air discharged from the inside of the foam body 2 to the outside of the foam body 2 during vibration and the amount of air compressed inside the foam body 2 during the vibration. The trajectory of the variation in the resonance magnification RM is considered to be represented by a quadratic curve C connecting the resonance magnifications RM of the examples and the comparative examples, as illustrated by the double-dotted chain line in FIG. 9.

According to the quadratic curve C of FIG. 9, the mode M2, in which the amount of air discharged from the inside of the foam body 2 to the outside of the foam body 2 during vibration is equal to the amount of air compressed inside the foam body 2 during the vibration, is the inflection point CP of the quadratic curve C. In other words, the minimum value of the resonance magnification RM of the cushion material 1 is RMx at the inflection point Pi (mode M2) of the quadratic curve C. Then, using the resonance frequency Fx at this time as a reference, in the mode M1, in which the amount of air compressed inside the foam body 2 during vibration is smaller than the amount of air discharged from the inside of the foam body 2, the minimum value of the resonance magnification RM of the cushion material 1 is considered to be represented by the quadratic curve C on the left side of the graph from the inflection point Pi. Also, in the mode M3, in which the amount of air compressed inside the foam body 2 during vibration is larger than the amount of air discharged from the inside of the foam body 2 to the outside of the foam body 2 during the vibration, the minimum value of the resonance magnification RM of the cushion material 1 is considered to be represented by the quadratic curve C on the right side of the graph from the inflection point Pi.

Figure 10:
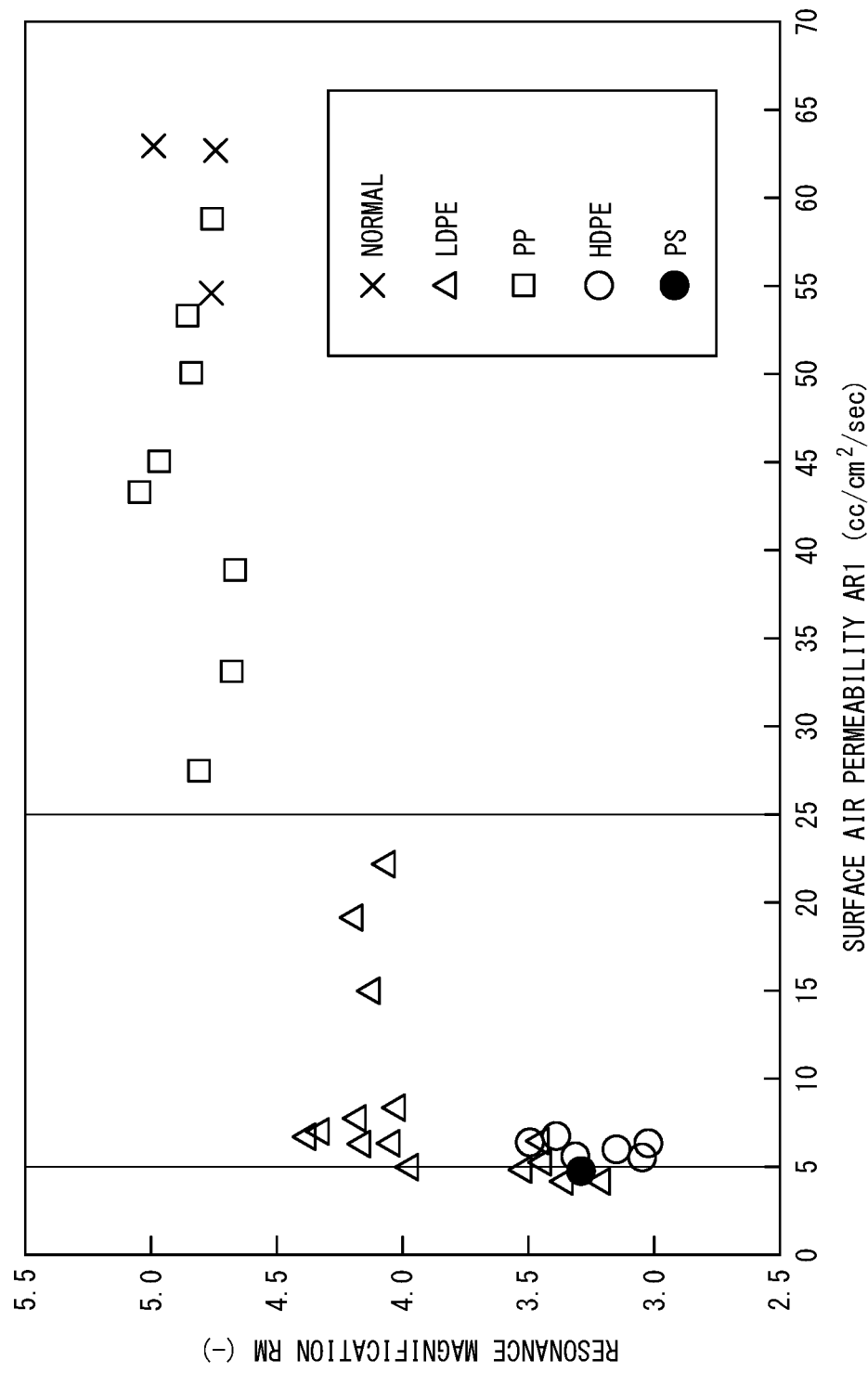
FIG. 10 is a graph that schematically illustrates the relationship between the surface air permeability of an air permeability control surface portion of a foam body, which is foam-molded using a molding die covered with resin, as an example of the air permeability control surface portion of the foam body, and the resonance magnification of the foam body, for different types of resin.

Next, FIG. 10 is a graph that schematically illustrates the relationship between the surface air permeability AR and the resonance magnification RM of each of air permeability control surface portions 21 of foam bodies 2, which are foam-molded using the molding die 100 covered with different types of resin M2, as examples of the air permeability control surface portion 21 of the foam body 2.

With reference to FIG. 10, as the surface air permeability AR1 of the foam body 2 decreases, the resonance magnification RM also tends to decrease. In particular, FIG. 10 indicates that the resonance magnification RM is sharply restrained at a surface air permeability AR1 of the foam body 2 of 25 cc/cm$^2$/sec. Therefore, it is found from FIG. 10 that the seat pads with AR1≤25 cc/cm$^2$/sec, as with the foam body 2 of this embodiment, can have effectively improved vibration absorptivity while maintaining air permeability.

In more detail, in the case of 25 cc/cm$^2$/sec<AR1, the resonance magnification RM exceeds 4.5. This test result is consistent with the test results of two types of foam bodies, i.e. the foam body in which foam molding was performed without covering the inner surface 100f of the molding die 100 with the resin M2, and the foam body in which foam molding was performed with covering the inner surface 100f of the molding die 100 with PP (polypropylene) as the resin M2.

In contrast, in the case of AR1≤25 cc/cm$^2$/sec, the resonance magnification RM is less than 4.5. This test result corresponds to the test results of three types of foam bodies, i.e. the foam body (hereinafter also referred to as "HDPE-type foam body") in which foam molding was performed with covering the inner surface 100f of the molding die 100 with HDPE (high-density polyethylene) as the resin M2, the foam body (hereinafter also referred to as "LDPE-type foam body") in which foam molding was performed with covering the inner surface 100f of the molding die 100 with LDPE (low-density polyethylene) as the resin M2, and the foam body (hereinafter also referred to as "PS-type foam body") in which foam molding was performed with covering the inner surface 100f of the molding die 100 with PS (polystyrene) as the resin M2.

Also, it is found from FIG. 10 that, according to the above three types of foam bodies, when the surface air permeability AR of each foam body is in the vicinity of AR1<5 cc/cm$^2$/sec, the resonance magnification RM tends to be sharply restrained, while the surface air permeability AR1 of the foam body is maintained.

In more detail, according to the two types of foam bodies, i.e. the HDPE-type foam body and the PS-type foam body, the resonance magnification RM is restrained at 3.0 to 3.5, in the vicinity of AR1=5 cc/cm$^2$/sec. Also, in the LDPE-type foam body, the resonance magnification RM is sometimes restrained at 3.0 to 3.5, in the vicinity of AR1=5 cc/cm$^2$/sec. In particular, in the case of the HDPE-type foam body, the resonance magnification RM is restrained most at around 3.0.

As is apparent from the above test results, the foam body 2 used in the cushion material manufacturing method according to the present disclosure preferably uses, as the molding die 100, a molding die the inner surface 100f of which is covered with high-density polyethylene. In this case, the resonance magnification RM of the foam body 2 can be most effectively reduced. Therefore, in this case, the vibration absorptivity is further improved.

In addition, as is apparent from the above test results, the foam body 2 used in the cushion material manufacturing method according to the present disclosure preferably uses, as the molding die 100, a molding die the inner surface 100f of which is covered with polystyrene. Also in this case, the resonant magnification RM of the foam body 2 can be reduced effectively, as in the case of using the molding die 100 the inner surface 100f of which is covered with high-density polyethylene. Therefore, in this case, the vibration absorptivity is further improved. In particular, when a molding die covered with HDPE is used, the resonance magnification RM is further reduced, in other words, the vibration absorptivity is further improved.

In addition, as is apparent from the above test results, the foam body 2 used in the cushion material manufacturing method according to the present disclosure preferably uses, as the molding die 100, a molding die the inner surface 100f of which is covered with low-density polyethylene. Also in this case, the vibration absorptivity is further improved.

The following table indicates the resonance frequency, resonance magnification, and surface air permeability of each of the foam bodies obtained by foam molding using the molding die 100 the inner surface 100f of which is covered with the resin M2, together with a remaining membrane ratio (%). PP-1 and PP-2 each represent polypropylene. Normal indicates a case in which foam molding was performed without covering the inner surface 10f of the molding die 100 with the resin M2. In other words, Normal indicates a cushion material of Comparative Example 2. The remaining membrane ratio (%) is, in the surface of the foam body, the remaining ratio of the cell membrane 5 to a predetermined area of the surface. Here, the predetermined area is a square area of 80 mm in length×80 mm in width.

TABLE 1

| Film Material | Remaining membrane ratio (%) | Resonance magnification (−) | Surface air permeablity (cc/cm²/sec) |
|---|---|---|---|
| PS | 98.6 | 3.30 | 4.6 |
| HDPE | 97.7 | 3.05 | 5.4 |
| LDPE | 97.4 | 4.06 | 22.0 |
| PP | 88.5 | 4.82 | 27.4 |
| Normal | 91.5 | 4.77 | 54.5 |

With reference to Table 1 above, it is found that, in molding the foam body 2, when high-density polyethylene is used as the resin M2 to cover the inner surface 100f of the molding die 100, the remaining ratio of the cell membrane is 97.5% or more and the surface air permeability AR1 satisfies 5 cc/cm²/sec<AR1≤25 cc/cm²/sec. It can also be found that the surface air permeability AR1 is restrained, as compared to the case of using polypropylene or low-density polyethylene as the resin M2 to cover the inner surface 100f of the molding die 100. In other words, when high-density polyethylene is used as the resin M2 to cover the inner surface 100f of the molding die 100, air-damping effect, i.e. vibration absorptivity becomes the best.

Also, with reference to Table 1 above, it is found that, in molding the foam body 2, when polystyrene is used as the resin M2 to cover the inner surface 100f of the molding die 100, the remaining ratio of the cell membrane is 97.5% or more, as in the case of using high-density polyethylene, and the surface air permeability AR1 satisfies 5 cc/cm²/sec<AR1≤25 cc/cm²/sec. Therefore, in this case too, vibration absorptivity becomes the best.

Also, with reference to Table 1 above, it is found that, in molding the foam body 2, when low-density polyethylene is used as the resin M2 to cover the inner surface 100f of the molding die 100, the remaining ratio of the cell membrane is 95% or more and the surface air permeability AR1 satisfies 5 cc/cm²/sec<AR1≤25 cc/cm²/sec. It can also be found that the surface air permeability AR1 is restrained, as compared to the case of using polypropylene as the resin M2 to cover the inner surface 100f of the molding die 100. In other words, the use of low-density polyethylene, as the resin M2 to cover the inner surface 100f of the molding die 100, results in better air-damping effect, i.e. better vibration absorptivity than the use of polypropylene.

The above describes exemplary embodiments of the present disclosure, and various modifications can be made without departing from the scope of the claims. In addition, the various configurations employed in each of the above-described embodiments can be mutually replaced as appropriate.

REFERENCE SIGNS LIST

1 Cushion material
2 Foam body
21 Air permeability control surface portion
22 Air permeability uncontrol surface portion
3 Covering material
3a Sheet member
3b Sol substance
1f Surface of seat pad (surface)
4 Cell frame
5 Cell membrane
6 Opening portion
100 Molding die
100f Inner surface of molding die
101 Upper die
101a Vent hole
101f Inner surface of upper die
102 Lower die
102f Inner surface of lower die
103 Protrusion
S Side
SP Side
D Defective portion
M1 Molding material
M2 Resin

The invention claimed is:

1. A cushion material comprising:
a foam body having a surface portion formed of an air permeability control surface portion and an air permeability uncontrol surface portion; and
a covering material comprising a sol substance, having an air permeability lower than that of the air permeability uncontrol surface portion, and configured to cover the air permeability uncontrol surface portion,
wherein the surface portion covers one of all faces of the foam body, wherein a surface air permeability of the air permeability control surface portion is 25 cc/cm²/sec or less as measured in compliance with JIS K 6400,
wherein a surface air permeability of the air permeability uncontrol surface portion is not controlled,
wherein a surface of the air permeability control surface portion has a small percentage of opening portions in which cell membranes are not formed on a cell frame compared to closed portions in which cell membranes are formed on the cell frame without breaking, wherein a surface of the air permeability uncontrol surface portion has a small percentage of closed portions in which cell membranes are formed on the cell frame without breaking compared to opening portions in which cell membranes are not formed on the cell frame, wherein the air permeability control surface portion and the air permeability uncontrol surface portion are on an identical face of the foam body, wherein the foam body is in the shape of hexahedron, the identical face of foam body is one face among the six faces of the foam body, wherein a surface portion of remaining five faces consists of the air permeability control surface portion, wherein the air permeability uncontrol surface portion includes an edge formed in the foam body, wherein the covering material covers the edge of the identical face of the foam body such that the portion of the identical face of the foam body other than the edge thereof is free of the covering material.

2. The cushion material according to claim 1, wherein the air permeability uncontrol surface portion includes a defective portion of the foam body.

3. The cushion material according to claim 2, wherein an outflow speed of air discharged from inside of the foam body to outside of the foam body during vibration is substantially equal to an inflow speed of air flowing into the inside of the foam body during the vibration.

4. The cushion material according to claim 1, wherein an inflow speed of air flowing into inside of the foam body during vibration is faster than an outflow speed of air discharged from the inside of the foam body to outside of the foam body during the vibration.

5. The cushion material according to claim 1, wherein an outflow speed of air discharged from inside of the foam body to outside of the foam body during vibration is substantially equal to an inflow speed of air flowing into the inside of the foam body during the vibration.

6. The cushion material according to claim 1, wherein an inflow speed of air flowing into inside of the foam body during vibration is slower than an outflow speed of air discharged from the inside of the foam body to outside of the foam body during the vibration.

7. The cushion material according to claim 1, wherein the covering material includes a sheet member.

* * * * *